US008872475B2

(12) United States Patent
Lin

(10) Patent No.: US 8,872,475 B2
(45) Date of Patent: Oct. 28, 2014

(54) RECHARGEABLE WIRELESS MOUSE

(75) Inventor: Yin-Yu Lin, Taipei (TW)

(73) Assignee: Giga-Byte Technology Co. Ltd, New Taipei (TW)

( * ) Notice: Subject to any disclaimer, the term of this patent is extended or adjusted under 35 U.S.C. 154(b) by 649 days.

(21) Appl. No.: 13/213,066

(22) Filed: Aug. 18, 2011

(65) Prior Publication Data

US 2013/0043830 A1 Feb. 21, 2013

(51) Int. Cl.
*H01M 10/46* (2006.01)
*H02J 7/00* (2006.01)

(52) U.S. Cl.
CPC ............ *H02J 7/0047* (2013.01); *H02J 7/0042* (2013.01); *H02J 2007/0062* (2013.01)
USPC ........................................................ 320/114

(58) Field of Classification Search
USPC .................................. 320/107, 111, 114, 115
See application file for complete search history.

(56) References Cited

U.S. PATENT DOCUMENTS

| 7,336,259 | B2* | 2/2008 | Li et al. ......................... 345/163 |
| 2003/0193476 | A1 | 10/2003 | Lu | |
| 2004/0142600 | A1* | 7/2004 | Metz ............................. 439/638 |
| 2004/0145565 | A1* | 7/2004 | Yang ............................. 345/163 |
| 2004/0252106 | A1 | 12/2004 | Koh | |
| 2006/0007147 | A1* | 1/2006 | Lee .............................. 345/163 |
| 2006/0232555 | A1 | 10/2006 | Wu | |
| 2007/0030248 | A1* | 2/2007 | Chen et al. .................... 345/163 |
| 2010/0283733 | A1 | 11/2010 | Wu et al. | |

FOREIGN PATENT DOCUMENTS

| CN | 101782809 A | 7/2010 |
| JP | 2003-036933 A | 7/2003 |
| JP | 2004-348196 A | 9/2004 |
| KR | 10-2007-0116465 A | 12/2007 |
| TW | M383868 U1 | 7/2010 |
| WO | WO2005026937 A1 | 3/2005 |

OTHER PUBLICATIONS

Title: Ultra-small mouse of lipstick shape extracted from Magazine: Nikkei PC No. 592 p. 30.

* cited by examiner

*Primary Examiner* — Edward Tso
(74) *Attorney, Agent, or Firm* — Chun-Ming Shih

(57) ABSTRACT

A mouse charging device is applying to an electronic device which comprises a power supply and a first connecting port. The mouse charging device comprises a mouse and a receiver. A charging module of the mouse is disposed in a shell of the mouse, and a first conductive piece of the mouse is disposed on the shell. The first conductive piece is electrically connected to the charging module. The receiver comprises a second connecting port and a second conductive piece. The second connecting port is electrically plugged in the first connecting port and electrically connected to the power supply. The second conductive piece is selectively coupled to the first conductive piece of the mouse. As the second conductive piece and the first conductive piece are coupled together, the power supply of the electronic device is available to charge the charging module of the mouse.

6 Claims, 6 Drawing Sheets

RECHARGEABLE WIRELESS MOUSE

BACKGROUND OF THE INVENTION

Field of the Invention

The present invention relates to a wireless mouse and more particularly to a rechargeable wireless mouse.

At present, the ways to energize the wireless mouse comprise: displacing a new battery for the wireless mouse, connecting the rechargeable wireless mouse with an electronic device by universal serial bus (USB), or plugging the rechargeable wireless mouse into a charger.

As the wireless mouse battery is running out, users have to replace. The replaced battery will cause environmental pollution and mercury pollution. On the contrary, as the rechargeable wireless mouse is out of battery, users can charge the rechargeable wireless mouse by a charger to reduce the pollution of the environment.

Furthermore, the rechargeable wireless mouse is able to connect with an electronic device via a USB transmission line. As the rechargeable wireless mouse connects with the electronic device via the USB transmission line, the rechargeable wireless mouse will be like a conventional wired mouse. The only difference is that the rechargeable wireless mouse is a real cordless type once the USB line is removed after the rechargeable wireless mouse is fully charged.

However, a user shall carry the USB transmission line or the charger all the time to charge the rechargeable wireless mouse. Sometimes the user tends to forget to take along the USB transmission line or the charger, which would fail to charge the rechargeable wireless mouse so that the rechargeable wireless mouse is incapable of being used.

SUMMARY OF THE INVENTION

In view of the forgoing problems, the present invention provides a mouse charging system for solving multiple problems, comprising environment, economic benefit and use space, relating to the frequent replacement of battery for the traditional wireless mouse or the required carrying of the connecting wires and chargers.

The present invention discloses a mouse charging system, applying to an electronic device which comprises a power supply and a first connecting port. The mouse charging system comprises a mouse and a receiver. The mouse comprises a shell, a charging module which is disposed in the shell, and a first conductive piece which is disposed on the shell, and the first conductive piece is electrically connected to the charging module.

The receiver comprises a second connecting port and a second conductive piece. The second connecting port is disposed on one end of the receiver, and the second connecting port is electrically plugging in the first connecting port of the electronic device, resulting in the electrical connection between the second connecting port and the power supply of the electronic device. The second conductive piece is disposed on another end of the receiver, and the second conductive piece is selectively coupled to the first conductive piece of the mouse. As the second conductive piece of the receiver and the first conductive piece of the mouse are coupled together, the electrical energy provided by the power supply of the electronic device can be transferred to charge the charging module of the mouse by means of the conduction between the first conductive piece of the mouse and second conductive piece of the receiver.

The effectiveness of the present invention lies in how the power supply of the electronic device charges the charging module of the mouse of the wireless mouse. As the second connecting port of the receiver is plugging in the first connecting port of the electronic device during the situation that the wireless mouse is in low voltage or no power state at all and the first conductive piece of the wireless mouse is attached directly to form electrical coupling with the second conductive piece of the receiver. Thus by means of the technique of the present invention, users are available to charge the wireless mouse without taking along any wires or chargers.

The characteristics, realization and functions of the present invention and disclosed in the following description with reference to the preferred exemplified embodiments and the accompanying drawings.

DETAILED DESCRIPTION OF THE INVENTION

Figure 1:
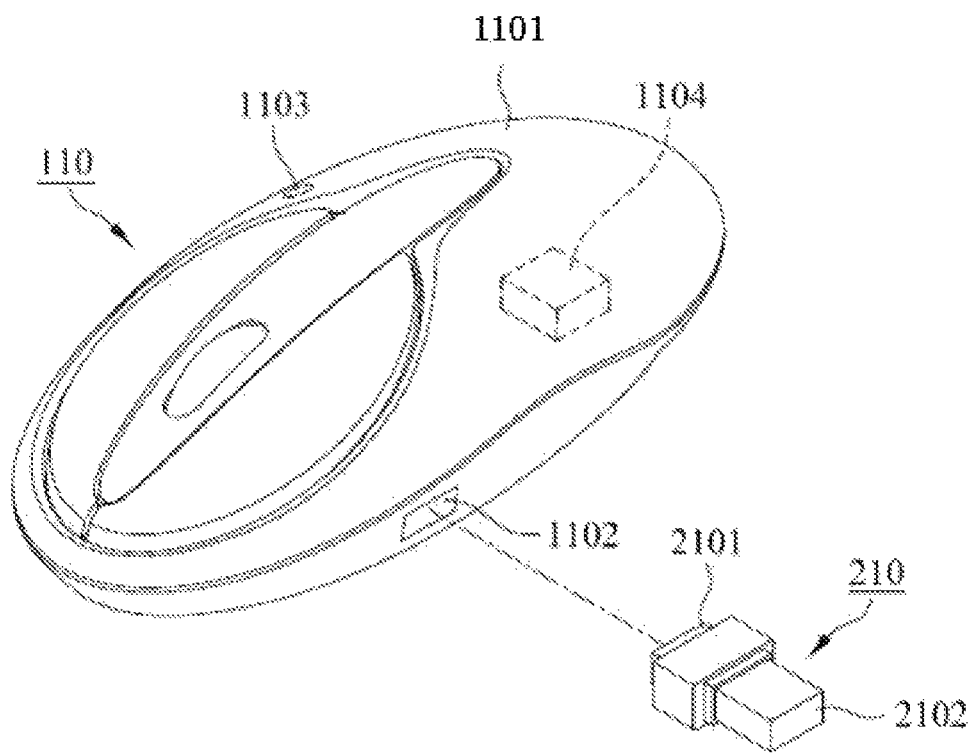
FIG. 1 is a three-dimensional diagram of a mouse charging system of one embodiment of the present invention.
Figure 2:
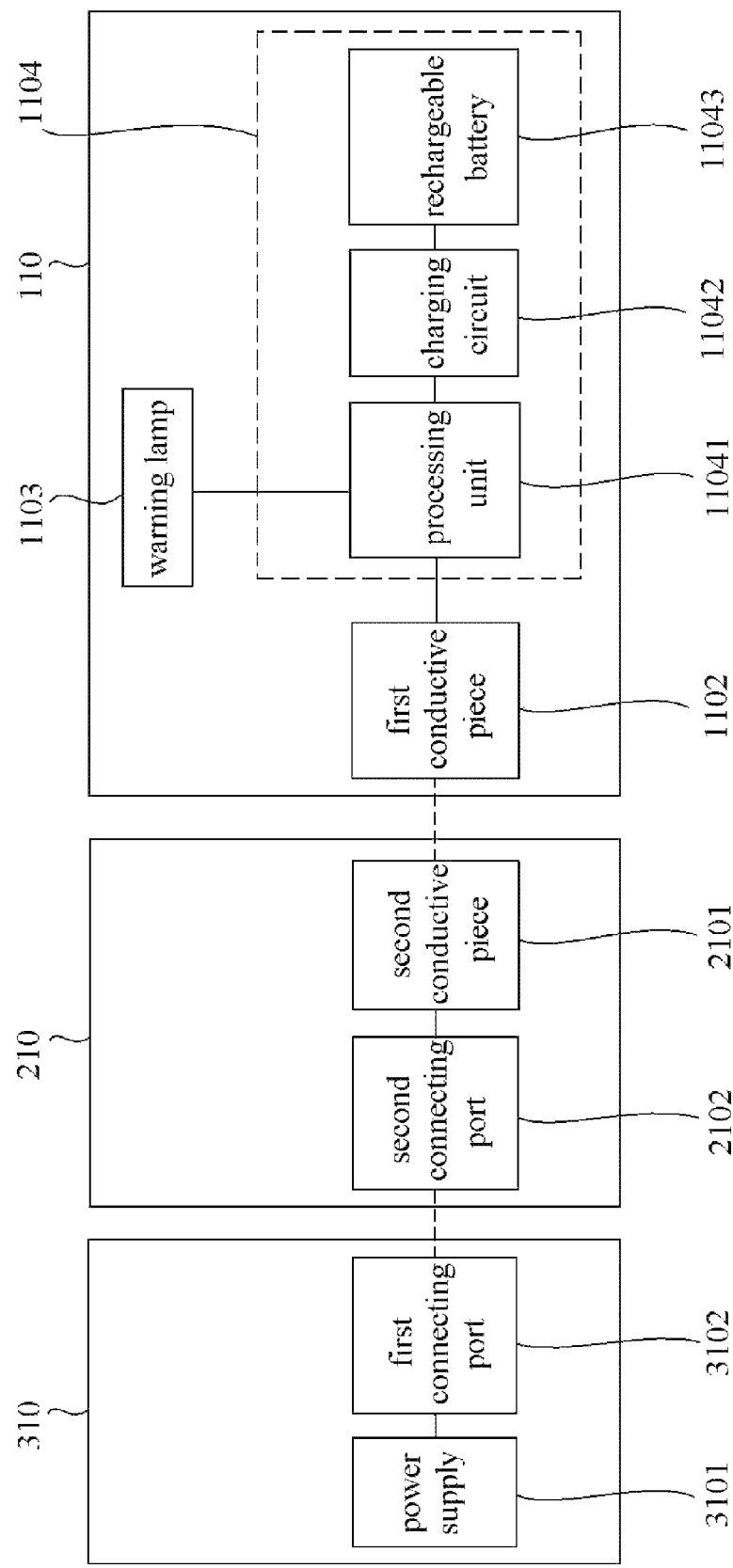
FIG. 2 is a circuit block diagram of a mouse charging system of one embodiment of the present invention.
Figure 3:
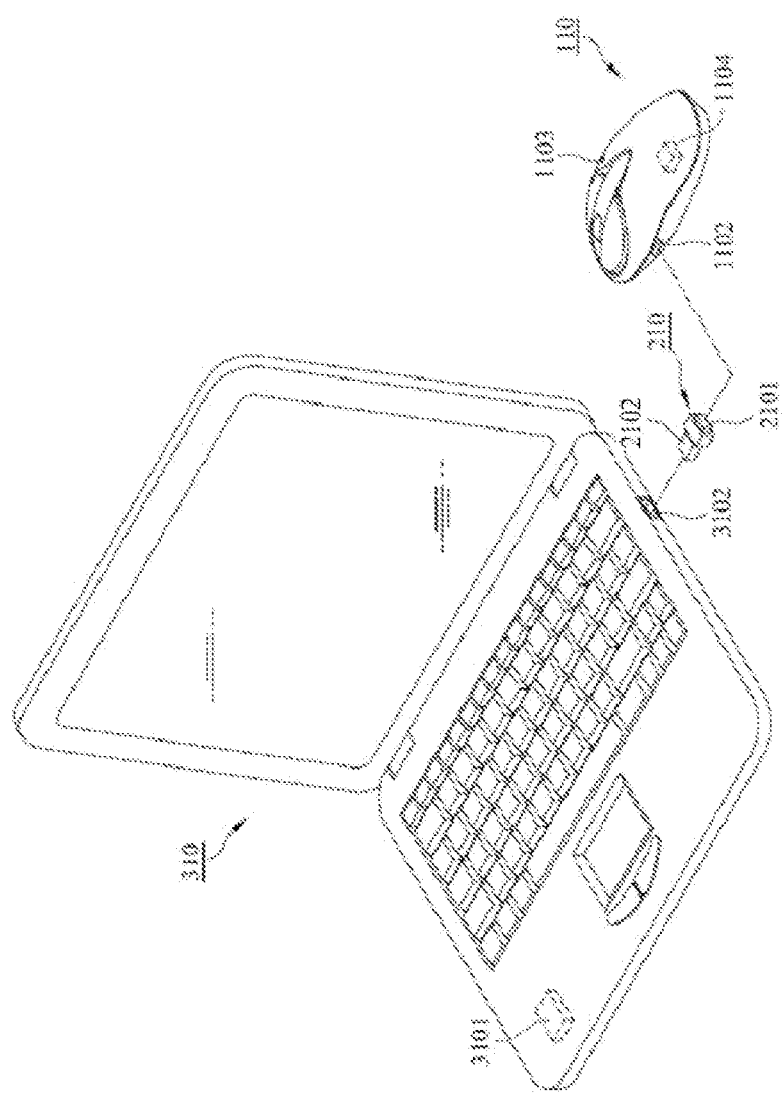
FIG. 3 is an exploded view of a mouse charging system of one embodiment of the present invention.

Referring to FIGS. 1 to 3, they show the three-dimensional diagrams and the circuit block diagram. The mouse charging system of an embodiment of the present invention, a mouse charging system is applying to an electronic device 310. The electronic device 310 comprises a power supply 3101 and a first connecting port 3102. The mouse charging system comprises a mouse 110 and a receiver 210.

In this embodiment, the mouse 110 and the receiver 210 transmit displacement control signal by wireless communication. That means the mouse 110 receives and transfers signals by the wireless connection through the receiver 210 to operate the cursor of the electronic device 310 for controlling the displacement of cursor to operate the electronic device 310. Controlling the displacement of the cursor in a windows of operation system of the electronic device by a wireless connection is a known technology, thus the applicant does not describe this known technology here.

Referring to FIGS. 1 and 2, the mouse 110 comprises a shell 1101, a first conductive piece 1102, a warning lamp 1103 and a charging module 1104. The charging module 1104 is disposed in the mouse 110, and the first conductive piece 1102 is disposed on the shell 1101. The first conductive piece 1102 is electrically connected to the charging module 1104.

The charging module 1104 of the present invention comprises a processing unit 11041, a charging circuit 11042 and a rechargeable battery 11043. The processing unit 11041 is electrically connected to the first conductive piece 1102 and the warning lamp 1103 of the mouse 110. The charging circuit 11042 is electrically connected to the processing unit 11041. The rechargeable battery 11043 is electrically connected to the charging circuit 11042. Furthermore, the first conductive piece 1102 of the mouse 110 is powered by the power supply 3101 of the electronic device 310, and the power supply 3101 charges the rechargeable battery 11043 by routing through the processing unit 11041 and the charging circuit 11042.

Referring again to FIGS. 1 and 2, the receiver 210 of the present invention comprises a second conductive piece 2101 and a second connecting port 2102. The electronic device 310 comprises a power supply 3101 and a first connecting port 3102. The receiver 210 selectively takes the second connecting port 2102 to plug in the first connecting port 3102 of the electronic device 310, to connect electrically the receiver 210 and the power supply 3101 of the electronic device 310. In addition, another function of the receiver 210 is to receive the displacement path of the wireless mouse. However, this is a known technology which won't be described in this embodiment.

Please refer to FIG. 3, it shows an exploded view of the mouse charging system of the embodiment of the present invention. The first conductive piece 1102 and the second conductive piece 2101 of the embodiment disclosed in the present invention are magnetic conductive pieces. The first conductive piece 1102 and the second conductive pieces 2101 are coupled together by magnetic attraction. In this embodiment, the first conductive piece 1102 and the second conductive piece 2101 are made of iron, nickel, cobalt, ferrosilicon or any material that is used as a magnetic conductor. Moreover, the first conductive piece 1102 and the second conductive piece 2101 take circle, square, rectangle or any other shapes. It's worth to notice that the present invention does not limit the materials and shapes of the first conductive piece 1102 and the second conductive piece 2101. For a person skilled in the art could amend the materials and shapes of the first conductive piece 1102 and the second conductive piece 2101 depending on the practical designing requirements or using requirements.

Figure 4:
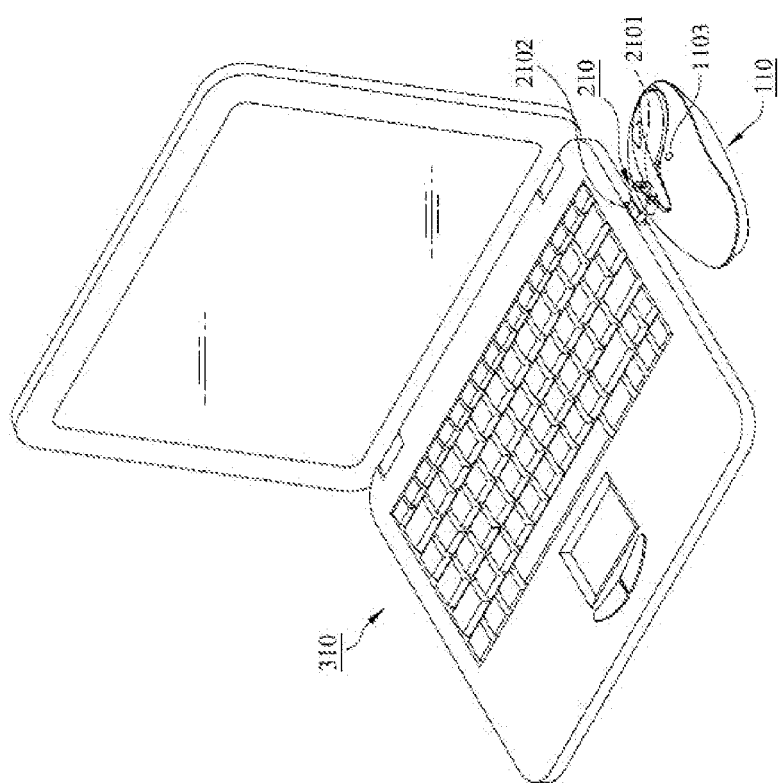
FIG. 4 is a three-dimensional schematic diagram of a charging status of the mouse of one embodiment of the present invention.
Figure 5:
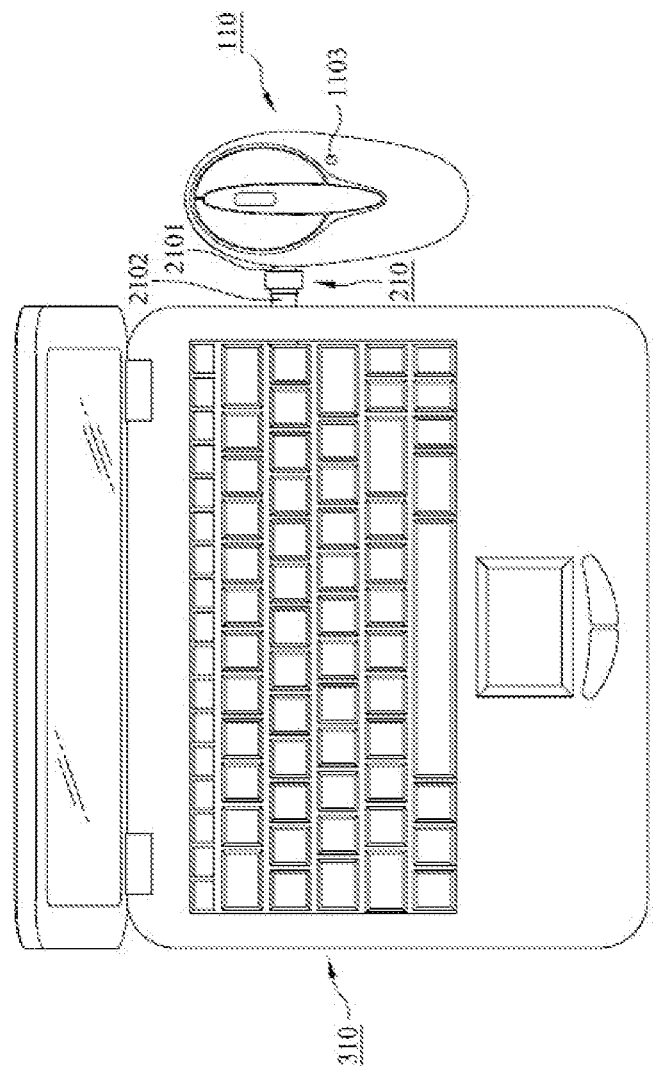
FIG. 5 is a plan view of a charging status of the mouse of one embodiment of the present invention.

Please refer to FIGS. 3 to 5, which show the exploded view and diagrams of the charging state. In one embodiment of the present invention, when a user uses the wireless mouse in a long time making the wireless mouse lose power, the processing unit 11041 of the mouse charging system detects the power state of the rechargeable battery 11043 and selectively signals the warning lamp 1103. Therefore, the warning lamp 1103 signals a warming for showing the user that the wireless mouse needs to charge.

For example, please refer to FIGS. 3 and 4, and go with FIG. 2 at the same time, as the warning lamp 1103 of the mouse 110 signals a warming about low voltage or no power state, the user can take the second connecting port 2102 of the receiver 210 plugging to the first connecting port 3102 of the electronic device 310 at first. Thus, the receiver 210 is electrically connected to the power supply of the electronic device 310. Subsequently, the first conductive piece 1102 of the mouse 110 and the second conductive piece 2101 of the receiver 210 are coupled together by magnetic attraction. At this time, the electrical energy of the power supply 3101 of the electronic device 310 is from the first connecting port 3102 passing through the second connecting port 2102 and the second conductive piece 2101 of the receiver 210 into the first conductive piece 1102 of the mouse 110, then charges the rechargeable battery 11043 through the charging circuit 11042 and the processing unit 11041 in the charging module 1104 of the mouse 110. When the power reaches the fully charging state, the warning lamp 1103 of the mouse 110 will signal a warning about the fully charging state for the user. The user can separate the mouse 110 from the receiver 210 and continues to use the wireless mouse.

Please refer to FIG. 5, it shows a plan view of charging state of the mouse 110 of the present embodiment. FIG. 5 illustrates clearly that when the warning lamp 1103 signals a warning about low voltage or no power state, the receiver 210 is plugged into the electronic device 310 and the mouse 110 is electrically connected to the receiver 210 for charging. It's worth to notices that, in this embodiment, the warning lamp 1103 is triggered to radiate a light color, such as a red flasher, for signaling low voltage or no power state, and radiate another light color, such as a green continuing light, for signaling power fully charging state. However, the present invention does not limit the numbers or light colors of the warning lamps 100. A person skilled in the art could amend the numbers and color lights of the warning lamp 1103 depending on the practical designing requirements or using requirements.

Figure 6:
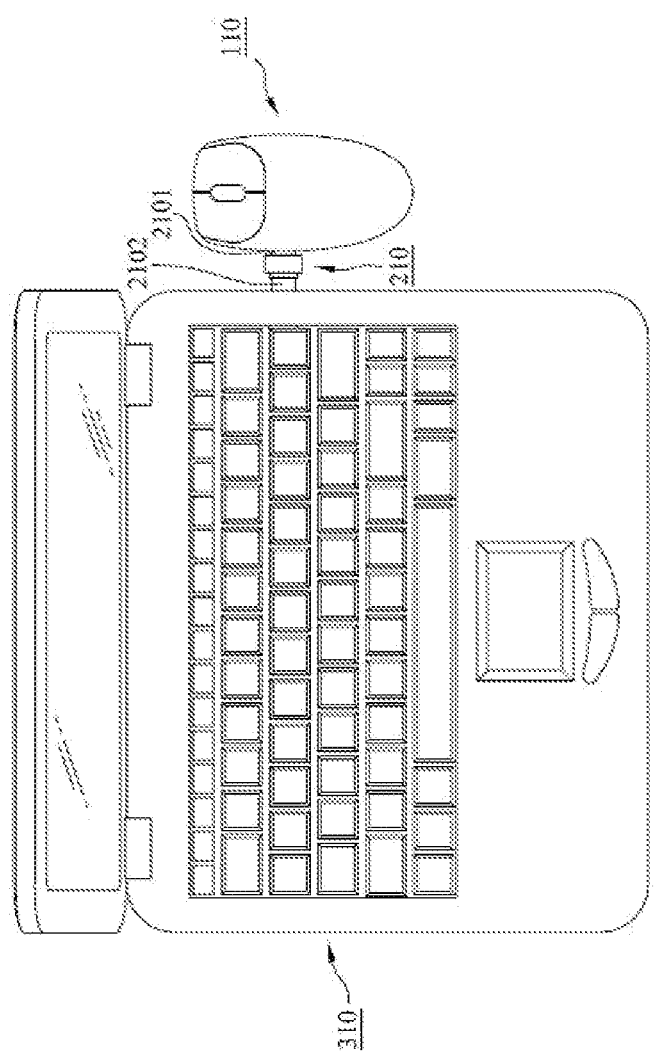
FIG. 6 is a plan view of a charging status of the mouse of another embodiment of the present invention.

Please refer to FIG. 6, it shows a plan view of charging state of the mouse 110 of another embodiment of the present invention. In this embodiment, any warning lamp 1103 doesn't need to being disposed on the mouse 110. In general, a user needs to plug the receiver 210 into the electronic device 310 before he (or she) use the wireless mouse. He (or she) finds the displacements of the cursor in the windows slowly or non-response when he (or she) moves the wireless mouse, and this situation means that the mouse 110 of the wireless mouse in low voltage or no power state. Therefore, the user should keep the mouse 110 connect electrically to the receiver 210 for charging the mouse 110 through the receiver 210.

As mentioned-above, the mouse charging system technology disclosed in the present invention can make users without taking along any wires or chargers to charge their wireless mouse.

The present invention has been described with reference to the preferred embodiment thereof and it is understood that the embodiments are not intended to limit the scope of the present invention. Moreover, as the contents disclosed herein should be readily understood and can be implemented by a person skilled in the art, all equivalent changes or modifications which do not depart from the spirit of the present invention should be encompassed by the appended claims.

What is claimed is:

1. A rechargeable wireless mouse, applying to an electronic device, the electronic device comprising a power supply and a first connecting port, comprising:
   a mouse, comprising:
      a shell;
      a charging module, disposed in the shell; and
      a first conductive piece, disposed on the shell, and the first conductive piece electrically connected to the charging module; and
   a receiver, comprising:
      a second connecting port, disposed on one end of said receiver, and the second connecting port electrically plugging in the first connecting port and electrically being connected to the power supply; and
      a second conductive piece, disposed on another end of said receiver, and the second conductive piece selectively being coupled to the first conductive piece;
   wherein, as the second conductive piece and the first conductive piece are coupled together, the power supply of the electronic device charges the charging module of said mouse through said receiver, wherein the first conductive piece and the second conductive piece are magnetic conductive pieces, and the first conductive piece and the second conductive piece are coupled together by magnetic attraction.

2. A rechargeable wireless mouse as in claim 1, wherein the charging module further comprises:

a processing unit, electrically connected to the first conductive piece;

a charging circuit, electrically connected to the processing unit; and a rechargeable battery, electrically connected to the charging circuit;

wherein said mouse is powered by the power supply of the electronic device, and the power supply charges the rechargeable battery by routing through the processing unit and the charging circuit.

3. A rechargeable wireless mouse as in claim 2, further comprising a warming lamp electrically connected to the processing unit, and the processing unit selectively signals the warning lamp to trigger said warming lamp to signal a warming.

4. A rechargeable wireless mouse as in claim 1, wherein the first conductive piece and the second conductive piece are made of iron, nickel, cobalt, ferrosilicon or any material that is used as a magnetic conductor.

5. A rechargeable wireless mouse as in claim 1, wherein the first conductive piece and the second conductive piece take circle, square, rectangle or any other shapes.

6. A rechargeable wireless mouse as in claim 1, wherein said mouse communicates with the electronic device by a wireless connection.

* * * * *